United States Patent Office 2,867,665
Patented Jan. 6, 1959

2,867,665

ALKYLENEBIS[TRIALKYLPHOSPHONIUM HALIDES] AND PROCESSES FOR THE MANUFACTURE THEREOF

Clinton A. Dornfeld, Glenview, Ill., assignor to G. D. Searle & Co., Chicago, Ill., a corporation of Delaware No Drawing. Application July 9, 1956
Serial No. 596,439

4 Claims. (Cl. 260—606.5)

This invention relates to alkylenebis[trialkylphosphonium halides] and processes for the manufacture thereof. In particular, this invention relates to bis[trialkylphosphonium halides] of the formula $$R_3P^+—(C_{10}H_{20})—P^+R_32X^-$$

wherein R is a methyl or ethyl radical, and X is chlorine, bromine, or iodine.

This application is a continuation-in-part of the prior copending application of the same inventor Serial No. 362,688, filed June 18, 1953, now abandoned.

The compounds of this invention are useful because of their valuable pharmacological properties. For example, the claimed compounds are potent anti-hypertensive agents, being distinguished from superficially similar homologs of the prior art in that their capacity for lowering blood pressure is maintained over uncommonly long periods of time. Moreover, the subject compounds show appreciable anti-cholinergic activity. They have the property of blocking the transmission of nerve impulses across the autonomic ganglia, thereby producing the chemical equivalent of sympathectomy, the surgical interruption of some portion of the sympathetic nervous pathway.

The compounds to which this invention relates are soluble in water, as also in aqueous solutions of alcohols and other water-miscible organic solvents. They may be administered in solid form as tablets or capsules; dissolved in aqueous media, they may be given parenterally.

The subject compounds are conveniently prepared in accordance with the following procedure: An appropriate phosphine (namely, trimethyl- or triethylphosphine) is reacted with a suitable decamethylene bromide or iodide (for example, 1,10-dibromodecane), using chloroform, methyl ethyl ketone, or other inert, polar solvent as the reaction medium. The reactants are ordinarily maintained at temperatures of the order of 50 to 150° centigrade, preferably between 65 and 100° centigrade, for periods of time ranging upward of 24 hours to complete the reaction, which is generally carried out in an inert atmosphere—for example, under nitrogen. A sealed vessel is used to maintain the reagents when the selected operating temperatures require working under pressure. The phosphonium bromides and iodides of this invention thus derived, are converted to the claimed chlorides by heating with silver chloride—for example in aqueous medium over a 2 hour period.

The following examples describe in detail certain of the compounds illustrative of the present invention, and methods which have been devised for their manufacture. However, the invention is not to be construed as limited thereby, either in spirit or in scope, since it will be apparent to those skilled in the art of organic synthesis that many modifications, both of materials and of methods, may be practiced without departing from the purpose and intent of this disclosure. In the examples hereinafter detailed, temperatures are given in degrees centigrade (° C.) and relative amounts of materials in parts by weight, except as otherwise noted.

Example 1

*Decamethylenebis[triethylphosphonium bromide].*—A solution of 59 parts of triethylphosphine and 75 parts of 1,10-dibromodecane in 750 parts of chloroform is maintained in a nitrogen atmosphere at 80° C. for 5 days, the reaction being carried out in a sealed vessel. The reactants are then cooled and mixed with dry ether, whereupon a gummy precipitate forms. Decantation of solvent and repeated washing with dry ether cause this material to granulate. Filtered off and dried in vacuo, it melts at 226–230° C. The product, decamethylenebis[triethylphosphonium bromide], has the formula $$(C_2H_5)_3P^+—(CH_2)_{10}—P^+(C_2H_5)_32Br^-$$

Example 2

*Decamethylenebis[trimethylphosphonium iodide].*—A mixture of 25 parts of trimethylphosphine, 131 parts of 1,5-diiododecane, and 4500 parts of chloroform is allowed to react at 100° C. in a sealed vessel under a nitrogen atmosphere for 3 days. The reaction mixture, cooled to room temperature, is then diluted with approximately 2 volumes of dry ether, whereupon a precipitate forms. This precipitate is decamethylenebis[trimethylphosphonium iodide]. It has the formula $$(CH_3)_3P^+—(CH_2)_{10}—P^+(CH_3)_32I^-$$

Example 3

*Decamethylenebis[trimethylphosphonium chloride].*— A solution of 28 parts of the bisiodo compound of the preceeding Example 2 in 4000 parts of water is mixed with 14 parts of silver chloride and refluxed for 2 hours. The decamethylenebis[trimethylphosphonium chloride] thus produced has the formula $$(CH_3)_3P^+—(CH_2)_{10}—P^+(CH_3)_32Cl^-$$

What is claimed is:

1. A compound of the formula $$R_3P^+—(C_{10}H_{20})—P^+R_32X^-$$

wherein R is selected from the group consisting of methyl and ethyl radicals, and X is halogen selected from the group consisting of chlorine, bromine, and iodine.

2. Decamethylenebis[triethylphosphonium bromide].

3. In a process for producing a compound of the formula $$R_3P^+—(C_{10}H_{20})—P^+R_32X^-$$

wherein R is selected from the group consisting of methyl and ethyl radicals, and X is halogen selected from the group consisting of chlorine, bromine, and iodine, the step which comprises contacting a tertiary phosphine of the formula $$R_3P$$

with an alkylene halide of the formula $$X—(C_{10}H_{20})—X$$

at temperatures in the range from 50° to 150° centigrade, under an inert atmosphere, using an inert, organic solvent as the reaction medium, R and X in the latter two formulas above having the meanings hereinbefore assigned.

4. In a process for producing decamethylenebis[triethylphosphonium bromide], the step which comprises contacting triethylphosphine with 1,10-dibromodecane at temperatures between 65° and 100° centigrade, under nitrogen atmosphere, using chloroform as a reaction solvent.

References Cited in the file of this patent

FOREIGN PATENTS 941,193     Germany _____ Apr. 5, 1956

OTHER REFERENCES

Kosolapoff: "Organophosphorus Compounds," John Wiley & Sons, Inc., New York (1950), pp. 78, 89.

Ginzel et al.: "Naunyn-Schmiedeberg's Arch exptl. Pathol. Pharmakol.," Bande 217 (1953), page 173.